United States Patent [19]

Miyauchi

[11] Patent Number: 4,813,741
[45] Date of Patent: Mar. 21, 1989

[54] CAR SEAT

[75] Inventor: Fumio Miyauchi, Ayase, Japan

[73] Assignee: Ikeda Bussan Co., Ltd., Kanagawa, Japan

[21] Appl. No.: 127,501

[22] Filed: Dec. 1, 1987

[30] Foreign Application Priority Data

Dec. 26, 1986 [JP] Japan ................................ 61-204166

[51] Int. Cl.$^4$ .............................................. B60N 1/02
[52] U.S. Cl. ...................................... 297/341; 297/379
[58] Field of Search ......................... 297/341, 379, 365

[56] References Cited

U.S. PATENT DOCUMENTS

| 2,823,949 | 2/1958 | Williams et al. | 297/341 |
| 4,159,147 | 6/1979 | Kiyomitsu et al. | 297/341 |
| 4,295,682 | 10/1981 | Kluting et al. | 297/379 |
| 4,312,537 | 1/1982 | Lindenberg | 297/341 |
| 4,497,518 | 2/1985 | Nishimura et al. | 297/341 |
| 4,565,344 | 1/1986 | Iwami | 297/341 |
| 4,634,180 | 1/1987 | Zaveri et al. | 297/341 |
| 4,648,657 | 3/1987 | Cox et al. | 297/341 |

FOREIGN PATENT DOCUMENTS 60-35634  2/1985  Japan ................................. 297/341

Primary Examiner—Francis K. Zugel
Attorney, Agent, or Firm—Wenderoth, Lind & Ponack

[57] ABSTRACT

A car seat having a forward and rearward sliding mechanism for sliding a seat cushion in a horizontal direction, a reclining mechanism for inclining a seat back in a forward or rearward direction and a walk-in mechanism comprising means to associate the forward and rearward sliding mechanism with the reclining mechanism so that when the reclining mechanism inclines the seat back in the forward direction, the seat cushion is urged to move in a forward direction.

4 Claims, 2 Drawing Sheets

FIG. I 4,813,741

CAR SEAT

BACKGROUND OF THE INVENTION

In a two door type car, when a passenger or passengers on a rear seat or seats get on or off, it is required that a seat back for a front seat is inclined in a forward direction and a seat cushion for the front seat moves to the foremost position. Thus, there has been used what is called a walk-in mechanism for a car seat which comprises a forward and rearward sliding mechanism for sliding a seat cushion in a horizontal direction and a reclining mechanism for inclining a seat back in a forward direction, the walk-in mechanism comprising means to associate the reclining mechanism with the forward and rearward sliding mechanism so that when the reclining mechanism inclines the seat back in the forward direction, the seat cushion is urged to move in a forward direction.

In the prior art, means to associate the reclining mechanism with the forward and rearward sliding mechanism comprises a sensor for sensing the forward inclination of the seat back such as a sensing wire which is provided in the reclining mechanism to sense an inclination of an arm securely provided on the side of the seat back and being pulled in response to the forward inclination of the seat back to pivotally move a sliding lever for the forward and rearward sliding mecnaism so that the sliding lever unlocks a movable rail which on the seat cushion is mounted. Thus, it will be noted that the construction of the walk-in mechanism is complicated and there are required a space for mounting the sensing wire, parts for the sensing wire such as guiding members and securing screws, for example, which causes the whole apparatus to be uneconomically manufactured.

SUMMARY OF THE INVENTION

Accordingly, it is a principal object of the invention to provide a car seat having a walk-in mechanism adapted to have a simple construction.

It is another object of the invention to provide a car seat having a walk-in mechanism adapted to be economically manufactured because of reduced parts.

It is further object of the invention to provide a car seat having a walk-in mechanism adapted to be produced with a small space and a high strength.

In accordance with the present invention, there is provided a car seat having a walk-in mechanism comprising a forward and rearward sliding mechanism including a movable rail on a cushion frame slidably engaging with a stationary rail securely mounted on a car body and a sliding lever having an engagement pawl engaged with said movable rail so as to lock said movable rail, a reclining mechanism provided on said cushion frame for inclining a seat back in forward and rearward directions and means to associate said forward and rearward sliding mechanism with said reclining mechanism so that the forward inclination of said seat back unlocks said movable rail from said stationary rail whereby said seat cushion is urged to move in a forward direction.

BRIEF DESCRIPTION OF THE DRAWAINGS

The above and other objects and features of the invention will be apparent from the description of an embodiment of the invention taken along with reference to the accompanying drawing in which.

DETAILED DESCRIPTION OF THE EMBODIMENT

Figure 1:
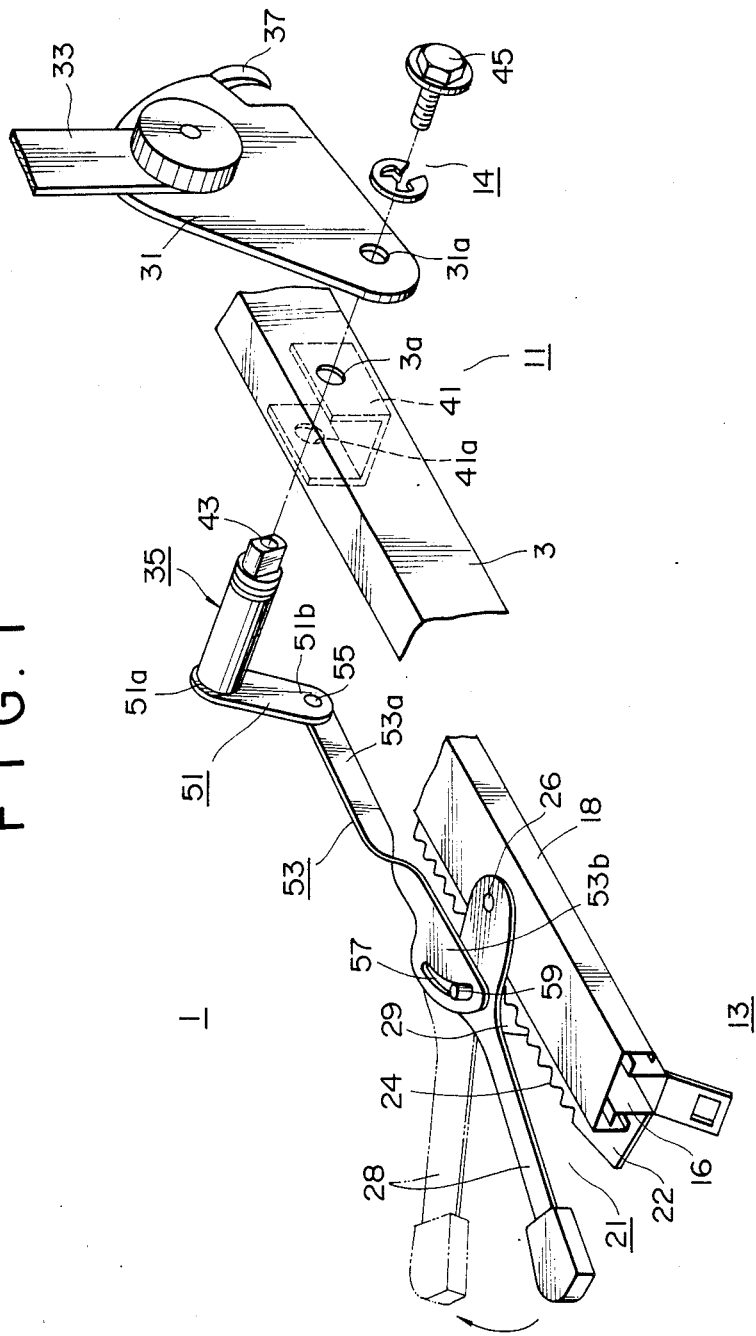
FIG. 1 is an exploded and perspective view of a walk-in mechanism for a car seat constructed in accordance with one embodiment of the invention.
Figure 2:
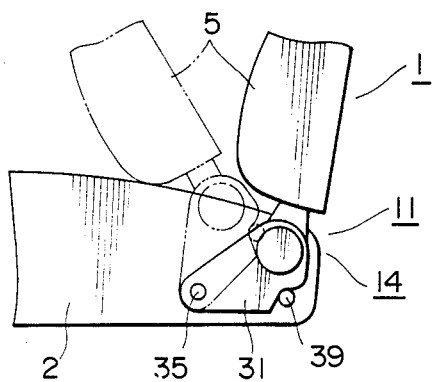
FIG. 2 is a side elevational view of a car seat.
Figure 3:
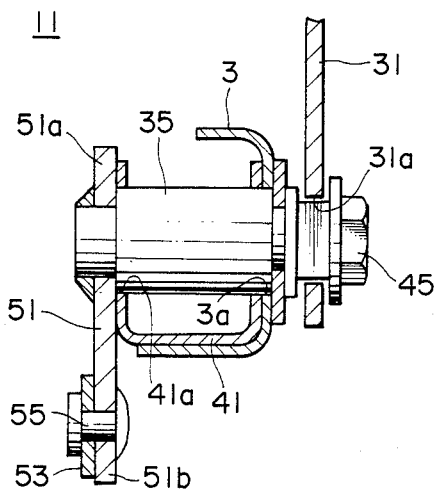
FIG. 3 is an enlarged cross sectional view of means to associate a forward and rearward sliding mechanism with a reclining mechanism.

Referring now to FIGS. 1 through 3 of the accompanying drawing, there is shown a walk-in mechanism 11 for a car seat 1 having a forward and rearward sliding mechanism 13 for horizontally sliding a seat cushion 2 in a forward or rearward direction and a reclining mechanism 14 for inclining a seat back 5 in a forward or rearward direction. The walk-in mechanism 11 comprises means to associate the forward and rearward sliding mechanism 11 with the reclining mechanism 14 so that the forward inclination of the seat back 5 allows the seat cushion 2 to move in a forward direction.

The forward and rearward sliding mechanism 13 includes a movable rail 18 securely mounted on a cushion frame 3 and slidably engaging with a stationary rail 16 which is in turn securely mounted on a car body. The forward and rearward sliding mechanism 13 further comprises locking means 21 for controlling the relative position of the stationary and movable rails 16 and 18. In the illustrated embodiment, the locking means 21 comprises a locking plate 22 provided on the stationary rail 16 and having a locking gear tooth 24 provided thereon and a sliding lever 28 pivotally mounted by a pivot pin 26 on the movable rail 18 and having an engagement pawl 29 engaged with the locking gear teeth 24 on the locking plate 22 so as to lock the movable rail 18 to the stationary rail 16. Although not shown, there is a locking spring which serves to urge the sliding lever 28 in its locking direction. It should be noted that the locking means 21 is never defined to the construction shown in FIG. 1.

The reclining mechanism 14 has a pivotal base 31 provided on the cushion frame 3 and an arm 33 pivotally mounted on the pivotal base 31. The seat back 5 at its lower end is mounted on the arm 33 as shown in FIG. 2. The pivotal base 31 at its front end is pivotally connected to the cushion frame 3 by a rotary shaft 35 and its rear end is provided with a hook 37. The position of the pivotal base 31 is controlled by the hook 37 catched by an engagement pin 39 which is in turn secured to the cushion frame 3. It will be noted that the hook 37 and the engagement pin 39 may be replaced by another appropriate locking mechanism for locking the rear end of the pivotal base 31 to the cushion frame 3. The cushion frame 3 has a substantially U-shaped support bracket 41 secured thereto. The rotary shaft 35 extends through holes 41a in the support bracket 41, a hole 3a in the cushion frame 3 and a hole 31a in the pivotal base 31 so as to outwardly protrude from the pivotal base 31. A tightening bolt 45 is threadably engaged with a tapped hole 43 in the end face of rotary shaft 35 to secure the rotary shaft 35 to the pivotal base 31. Thus, it will be noted that the pivotal base 31 can be pivotally moved about the axis of the rotary shaft 35 together with the rotation of the rotary shaft 35.

There is provided means to associate the forward and rearward sliding mechanism 13 with the reclining mechanism 14 so that the inclination of the seat back 5 unlocks the sliding lever 28 on the movable rail 18 from the stationary rail 16 whereby the seat cushion 2 is urged to move in a forward direction. The means to associate the sliding mechanism 13 with the reclining mechanism 14 comprises a link arm 51 having one end 51a secured to the rotary shaft 35 and the other end 51b pivotally connected by a pivot pin 55 to a rear end 53a of a connecting arm 53 in the form of strip. The connecting arm 53 has a twisted portion formed by twisting a middle portion of the connecting arm 53 by about 90 degrees to have a horizontal portion 53b formed thereby. The horizontal portion 53b of the connecting arm 53 has an arcuate hole or slot 57 formed therein. The sliding lever 28 has an engagement pin 59 provided thereon so as to upwardly protrude from the sliding lever 28 at the position where it is spaced from the pivotal point of the sliding lever 28. The engagement pin 59 extends through the arcuate hole 57 in the sliding lever 28 so that the unlocking movement of the sliding lever 28 (as indicated by anarrow of FIG. 1) never accompanies the pivotal movement of the connecting arm 53, but the backward movement of the connecting arm 53 causes the sliding lever 28 to pivotally move about the axis of the pivot pin 26 as indicated by the arrow of FIG. 1. In other words, unlocking of the seat for forward and rearward movement of the seat by the user never causes the seat back 5 to be inclined, but forward inclination of the seat back 5 unlocks sliding lever 28 for allowing the seat to be slid forwardly.

An operation of the car seat having the walk-in mechanism 11 will be described hereinjustbelow.

As shown in FIG. 2, the hook 37 of the pivotal base 31 is unlocked from the engagement pin 39 of the cushion frame 3 and then the seat back 5 is forwardly inclined as indicated at an imaginary line of FIG. 2. At that time, the pivotal base 31 of the reclining mechanism 14 which supports the seat back 5 pivotally moves about the axis of the rotary shaft 35 in a counterclockwise direction as viewed in FIG. 2, together with the rotary movement of the rotary shaft 35 about its axis in the same direction because of the rotary shaft 35 being securely connected to the pivotal base 31 by the tightening screw 45.

Thus, the link arm 51 pivotally moves about the axis of the rotary shaft 35 in a counterclockwise direction as viewed in FIG. 1 so that the end 51b of the link arm 51 moves in a rearward direction. This causes the connecting arm 53 to be pulled in a rearward direction. Since the front end 53b of the connecting arm 53 is connected to the sliding lever 28 by engagement of engagement pin 59 on sliding lever 28 with the arcuate hole 57 in connecting arm 53 at its front end 53b so that the engagement pin 59 is positioned at the front end of the arcuate hole 57 (in the normal locked position of the seat), the rearward movement of the connecting arm 53 causes the sliding lever 28 to pivotally move about the axis of the pivot pin 26 as indicated by the imaginary line of FIG. 1 by the engagement pin 59 being pulled in a rearward direction. The pivotal movement of the sliding lever 28 as indicated by the imaginary line of FIG. 1 causes the engagement pawl 29 to be disengaged from the locking gear teeth 24 on the locking plate 22 with the result that the movable rail 18 is unlocked from the stationary rail 16.

Although not shown, the movable rail 18 is urged by spring means not shown to be moved in a forward direction. Therefore, the movable rail 18 forwardly moves relative to the stationary rail 16 and as a result the seat cushion 2 of the car seat 1 forwardly moves together with the seat back 5.

Although one preferred embodiment of the invention has been illustrated and described with reference to the accompanying drawing, it will be understood by those skilled in the art that it is by way of example, and that various changes and modification may be made without departing from the spirit and scope of the invention, which is intended to be defined only by the appended claims.

What is claimed is;

1. A car seat comprising:
    a seat cushion frame;
    a seat cushion attached to said seat cushion frame;
    a seat back frame;
    a seat back attached to said seat back frame;
    a movable rail attached to said cushion frame for being adjustably slidably mounted on a stationary rail mounted in a car for allowing said car seat to be moved forwardly and rearwardly in a car;
    a locking means attached to said movable rail for locking said movable rail relative to a stationary rail in a car, said locking means including a sliding lever pivotably attached to said movable rail for locking and unlocking said locking means for locking and unlocking said movable rail relative to a stationary rail in a car, an engagement pin means attached to said sliding lever for moving said sliding lever for causing said sliding lever to lock and unlock said locking means;
    a reclining mechanism attached to said seat cushion frame and to said seat back frame, said reclining mechanism rotatably connecting said seat cushion frame and said seat back frame for inclining said seat back forwardly and rearwardly relative to said seat cushion; and
    connecting means attached to said locking means and to said reclining mechanism for unlocking said locking means only when said seat back is inclined forwardly relative to said seat cushion, said connecting means including a first link member having first and second ends, said first end of said first link member being fixedly connected to said seat back frame for rotation therewith, engaging means attached to said second end of said first link member for engaging said engagement pin means of said sliding lever for moving said engagement pin means for moving said sliding lever for unlocking said movable rail relative to a stationary rail on a car, said engaging means including a slot having first and second ends for engaging and moving said engagement pin means of said sliding lever, and said first end of said slot engaging and moving said engagement pin means for moving said sliding lever for unlocking said movable rail only when said seat back is inclined forwardly relative to said seat cushion.

2. A device as in claim 1, wherein said first link member of said connecting means includes a rotary shaft having first and second ends, and said engaging means includes a link arm having first and second ends, said first end of said link arm being fixedly attached to said rotary shaft for movement therewith, a connecting arm having first and second ends, said first end of said connecting arm being pivotably attached to said second end of said link arm, and said second end of said connecting arm including said slot of said engaging means.

3. A device as in claim 2, wherein said slot is arcuate.

4. A device in claim 1, wherein said reclining mechanism includes a pivotal base pivotably mounted on said cushion frame, and a locking means for locking said pivotal base relative to said cushion frame.

* * * * *